US008296489B2

(12) United States Patent
Wang

(10) Patent No.: US 8,296,489 B2
(45) Date of Patent: Oct. 23, 2012

(54) PRIORITY CONTROL DEVICE

(75) Inventor: Chien Chuan Wang, Jhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1323 days.

(21) Appl. No.: 12/000,805

(22) Filed: Dec. 18, 2007

(65) Prior Publication Data

US 2009/0021520 A1 Jan. 22, 2009

(30) Foreign Application Priority Data

Jul. 16, 2007 (TW) ............................... 96125908 A

(51) Int. Cl.
*G06F 12/00* (2006.01)

(52) U.S. Cl. ........... 710/244; 710/45; 710/200; 713/500

(58) Field of Classification Search .......... 710/240–244, 710/200, 260–269, 45; 365/158; 713/500–600
See application file for complete search history.

(56) References Cited

U.S. PATENT DOCUMENTS 4,833,653 A * 5/1989 Mashiko et al. .............. 365/203
2002/0161956 A1* 10/2002 Kanzaki et al. ............... 710/240
2007/0258304 A1* 11/2007 Chen et al. .................... 365/208

FOREIGN PATENT DOCUMENTS

JP 5081042 A 4/1993
TW 189363 8/1992
TW 200518169 6/2005

OTHER PUBLICATIONS

Taiwan Office Action, Jul. 10, 2012, 5 pages.

* cited by examiner

*Primary Examiner* — Brian Misiura
*Assistant Examiner* — Kim Huynh
(74) *Attorney, Agent, or Firm* — Edell, Shapiro & Finnan, LLC

(57) ABSTRACT

A priority control device comprises a clock generator for generating a clock signal, a time interval generating unit having a plurality of signal routes and each of the signal routes has a different signal passing time respectively, and a logic control unit coupled to the outputs of the signal routes. The time interval generating unit determines the timing of receiving input signals according to the clock signal. The logic control unit receives the output signals of the signal routes for generating the control signals.

11 Claims, 4 Drawing Sheets

PRIORITY CONTROL DEVICE

FIELD OF THE INVENTION

The invention relates to a priority control device, and more particularly for generating the time intervals between several access operations to avoid the confliction occurring when a memory is accessed simultaneously.

BACKGROUND OF THE INVENTION

Recently, the LCD displayer has been applied to many electronic productions, such as computer monitor, vehicle LCD monitor, LCD TV, portable IT productions, laptop computer, cell phone, digital camera or PDA. Because of having the advantages such as light weight, small volume and low power consumption, the application of the LCD display has grown greatly in recent years. When being applied in different productions, the LCD driving circuit must take different characters into consideration respectively. For example, when the LCD display is applied for the portable productions, the design of the LCD driving circuit has to pay much effort on the character of low power consumption in order to extend the usable time. In the other hand, if the driving circuit is applied for a large area LCD display, the ability of driving a high load rapidly is very important.

As the improvement of the resolution in the display, the volume of the SRAM inside the LCD driving IC is also increased. When the volume of the SRAM becomes larger, the area of the SRAM is bigger. For reducing the area of the SRAM to decrease the cost, the common solution is replacing the 2-port 8-T SRAM with the 1-port 6-T SRAM of which area is smaller to reduce the area of the SRAM.

When being applied in the LCD driving IC, the SRAM have to continuously output the frame data in a period to maintain the displaying speed of the display, ex. 60 frames per second. While the frame data is outputted from the SRAM, the circuit outside the driving IC sometimes wants to access the SRAM simultaneously. Since the access operation of the SRAM requested from the circuit outside the driving IC is not controlled by the driving IC, the circuits outside the driving IC and the circuits inside the driving IC sometimes access the SRAM simultaneously. However, the 1-port 6-T SRAM has only one I/O port, the circuits outside the driving IC and the driving IC can't access the SRAM simultaneously, and the confliction occurs when the circuits outside the driving IC and the driving IC access the SRAM simultaneously.

In view of the drawbacks of the prior art, the present invention provides a priority control device to overcome the drawbacks of the prior art.

SUMMARY OF THE INVENTION

It is one of objectives of the present invention to provide a priority control device for avoiding the confliction by generating time intervals between the access signals when a memory is requested to be accessed by these access signals simultaneously.

To achieve the objective mentioned above, the present invention provides a priority control device comprising a clock generator, a time interval generating unit and a logic control unit. The clock generator is for generating a clock signal. The time interval generating unit has a plurality of signal routes which have different signal passing times respectively. The time interval generating unit controls the timing of receiving input signals according to the clock signal. The logic control unit is coupled to outputs of the signal routes and for receiving the output signals from the signal routes so as to generate a plurality of control signals.

Besides, the present invention further provides a priority control device comprising a clock generator, a plurality of sense amplifiers and a logic control unit. The clock generator is for generating a clock signal. The input of each sense amplifier is for receiving the clock signal, and the another input of each sense amplifier is for receiving an access signal. Each different one of the sense amplifiers receives the access signal from the different sources respectively. The sense amplifiers have different voltage rise-times respectively. The logic control unit is coupled with outputs of the sense amplifiers and for determining the power of using an I/O port according to the output signals of the sense amplifiers.

BRIEF DESCRIPTION OF THE DRAWINGS

The subject matter regarded as the invention is particularly pointed out and distinctly claimed in the concluding portion of the specification. The invention together with features and advantages thereof may best be understood by reference to the following detailed description with the accompanying drawings in which:

DETAILED DESCRIPTION OF THE PREFERRED EMBODIMENTS

The present invention relates to a priority control device. While the specifications describe at least one embodiment of the invention considered best modes of practicing the invention, it should be understood that the invention can be implemented in many ways and is not limited to the particular examples described below or to the particular manner in which any features of such examples are implemented.

In an embodiment, the priority control device in accordance with the present invention is applied for controlling the priority of accessing a memory. Since the memory has only one I/O port, the priority control device in accordance with the present invention can avoid the confliction when a memory is requested to access from different sources simultaneously.

Figure 1:
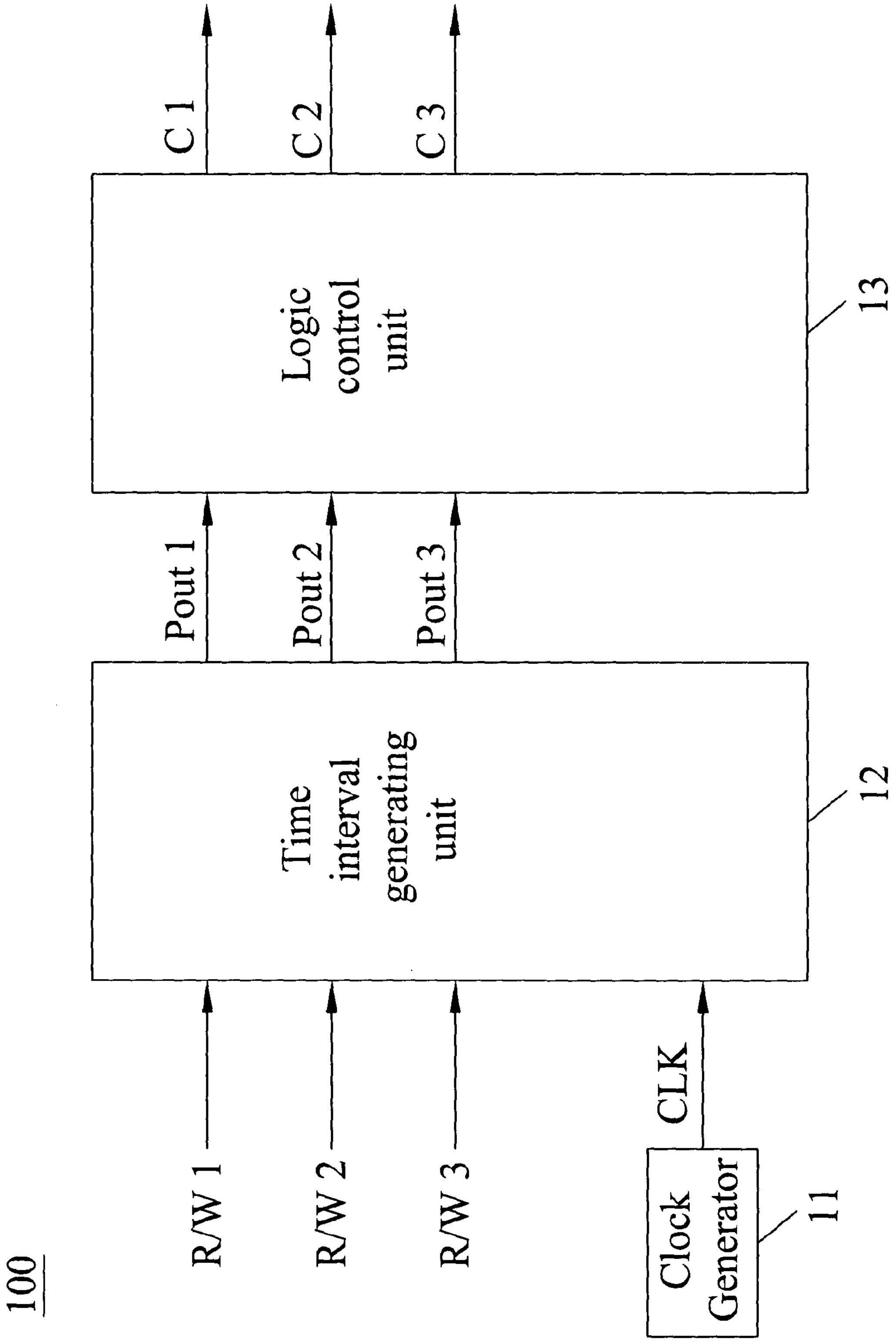
FIG. 1 is a block diagram of the priority control device of the present invention.

Please referring to FIG. 1 for a block diagram of the priority control device of the present invention, the priority control device 100 comprises a clock generator 11, a time interval generating unit 12 and a logic control unit 13. The clock generator 11 is used to generate a clock signal (CLK). The time interval generating unit 12 comprises a plurality of signal routes. Each one of the signal routes has different signal passing time and receives input signal from different source respectively. When several input signals are inputted to the time interval generating unit 12 simultaneously, the input signals are passed through different signal routes respectively and outputted with time intervals. In other words, the input signals will not be outputted simultaneously. Besides, the time interval generating unit 12 can control the timing of receiving the input signals according to the clock signal (CLK). The logic control unit 13 is coupled to the outputs of the signal routes for receiving the output signals of the signal routes, so as to generate a plurality of control signals according to the output signals.

Figure 2:
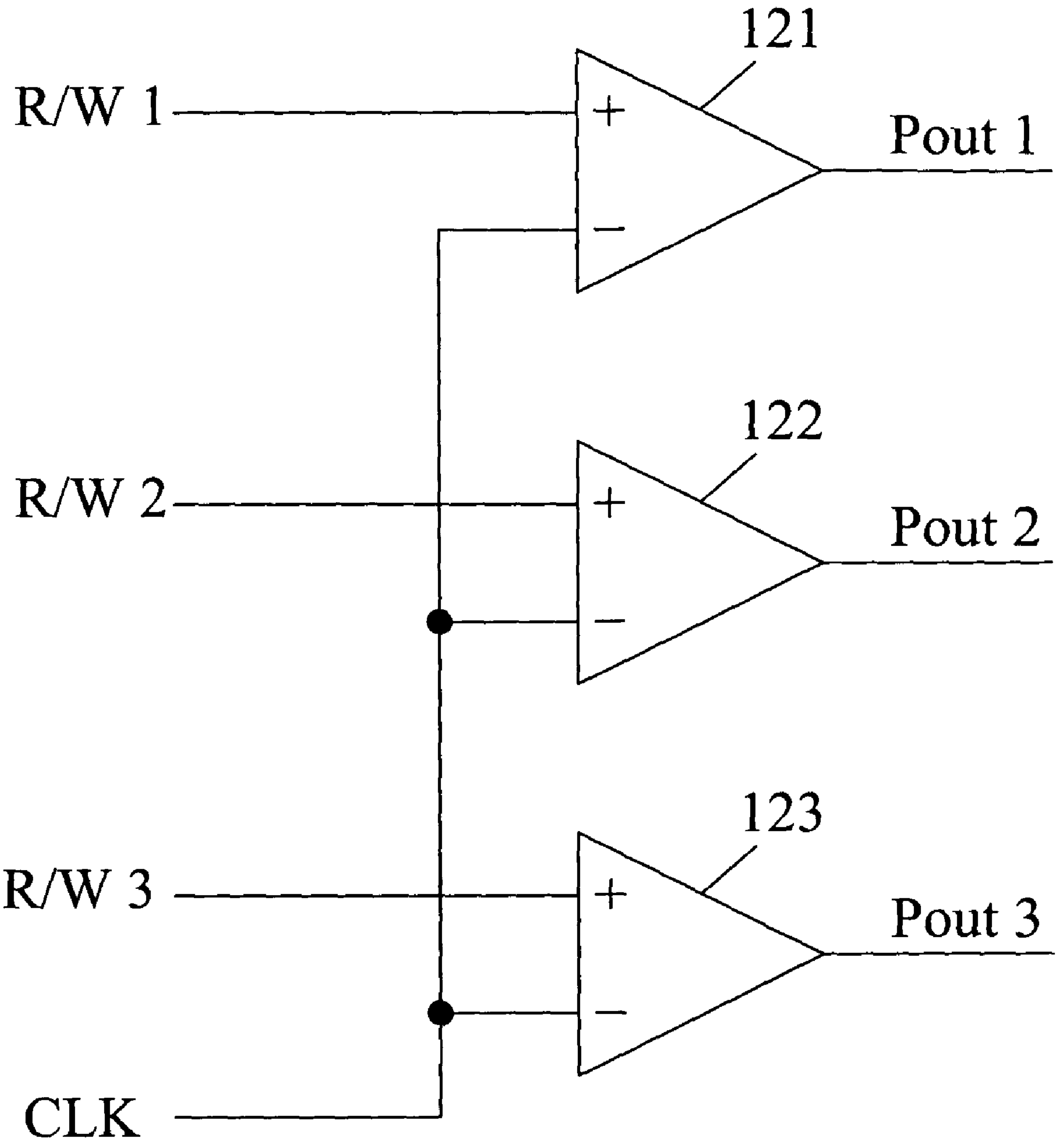
FIG. 2 is a schematic view of an embodiment of the time interval generating unit of the present invention.

Please refer to FIG. 2 for a schematic view of an embodiment of the time interval generating unit 12 of the present invention. In this embodiment, the time interval generating unit 12 has three signal routes, and each one of the signal routes comprises a sense amplifier 121, 122 or 123. The sense amplifier of the different signal routes has different VT value resulting in different voltage rise-time. One input of the sense amplifiers 121, 122 and 123 are applied for receiving a first access signal R/W1, a second access signal R/W2 or a third access signal R/W3 respectively. And another input of the sense amplifiers 121, 122 and 123 are applied for receiving a clock signal CLK. In the embodiment, the first access signal R/W1, the second access signal R/W2 and the third access signal R/W3 represent the request signals from the first I/O port, the second I/O port and the third I/O port respectively.

Figure 3A:
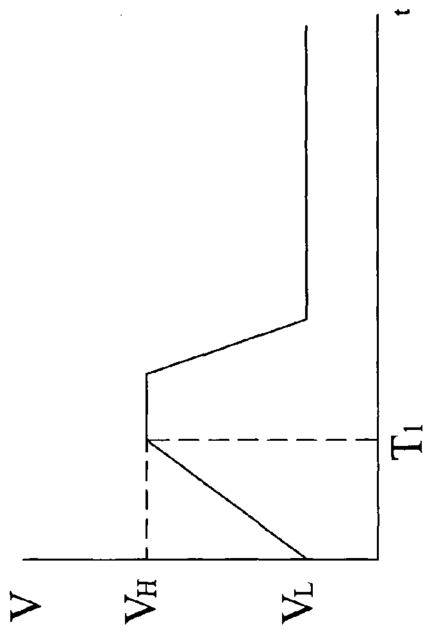
FIG. 3*a* is a schematic view of the voltage rise-time in the sense amplifier 121 of the embodiment shown in FIG. 2.
Figure 3B:
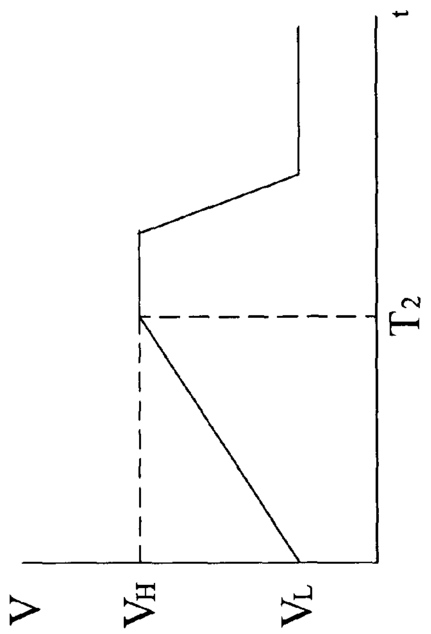
FIG. 3*b* is a schematic view of the voltage rise-time in the sense amplifier 122 of the embodiment shown in FIG. 2.
Figure 3C:
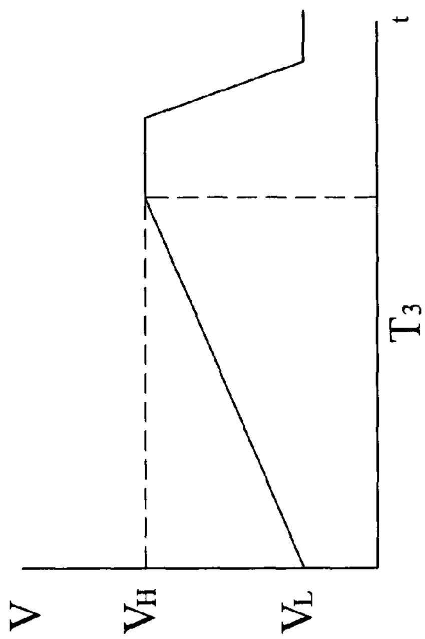
FIG. 3*c* is a schematic view of the voltage rise-time in the sense amplifier 123 of the embodiment shown in FIG. 2.

Please refer to FIG. 3*a*, FIG. 3*b* and FIG. 3*c*, which show a schematic view of the voltage rise time of the sense amplifier 121, 122 and 123 respectively, after receiving an input signal. The sense amplifier 121, 122 and 123 of time interval generating unit 12 have different voltage rise-times respectively. Take FIG. 3*a* for instance, when the sense amplifier 121 receives the input signal, it takes time T1 to raise the voltage from $V_L$ to $V_H$. Therefore, the sense amplifier 121 takes time T1 to raise the voltage of the output signal Pout1 to $V_H$ when receiving the input signal. Similarly, as is shown in FIGS. 3*b* and 3*c*, the sense amplifier 122 takes time T2 to raise the voltage of the output signal Pout2 to $V_H$ when receiving the input signal, and the sense amplifier 123 takes time T3 to raise the voltage of the output signal Pout3 to $V_H$ when receiving the input signal.

The time intervals between the T1, T2 and T3 can be adjusted according to the actual situation. And the time interval between the T1 and T2 or between the T2 and T3 must be large enough for the memory to complete at least one access operation. Since the sense amplifier 121 has the shortest voltage rise-time, it also means that the sense amplifier 121 has the highest priority. The access signal passing through the sense amplifier 121 can access the memory first when more than two access signals are inputted to time interval generating unit 12 simultaneously.

In the embodiment mentioned above, although the sense amplifier 121, 122 and 123 have different voltage rise-times, the confliction resulted from that the I/O port of the memory is accessed by request signals from different sources simultaneously sometimes still happens in actual. For example, when the first access signal R/W1 is inputted to the sense amplifier 121 after the second access signal R/W2 is inputted to the sense amplifier 122, because the voltage rise-time T1 of the sense amplifier 121 is shorter than the voltage rise-time T2 of the sense amplifier 122, the sense amplifier 121 and the sense amplifier 122 may output the voltage signals $V_H$ simultaneously or the time interval between the sense amplifier 121 and the sense amplifier 122 output the voltage signal $V_H$ is too short for the memory to complete the access operation requested by the second access signal R/W2. The situations mentioned above results in confliction of accessing the memory. To avoid such confliction, the present invention applies the clock generator 21 to generate the clock signal CLK inputted to the sense amplifier 121, 122 and 123, so as to control the timing of the sense amplifiers 121, 122 and 123 to receive the input signals. For example, the input signal is allowed into the sense amplifier 121, 122 or 123 when pulse of the clock signal (CLK) is inputted to the sense amplifier 121, 122 or 123. Therefore, the confliction mentioned above can be avoided by well design of the clock signal CLK. For example, the period of the clock signal can be designed to be longer than the sum of a time difference between T3 and T1 and a time needed for the memory to complete at least one access operation.

Preferably, the clock generator 11 can be an oscillator. The clock generator 11 will induce too much power consumption if generating the clock signal (CLK) continuously. Therefore, it is unsuitable for a portable apparatus. In one preferred embodiment of the present invention, the clock generator 11 starts to generate the clock signal when input signals are inputted to the time interval generating unit 12 simultaneously for saving power.

In one embodiment of the present invention, the VT values of the sense amplifier 121, 122 and 123 mentioned above can be dynamically adjusted for various applications to adjust the priority and the time intervals of the access signals for preventing the confliction.

Figure 4:
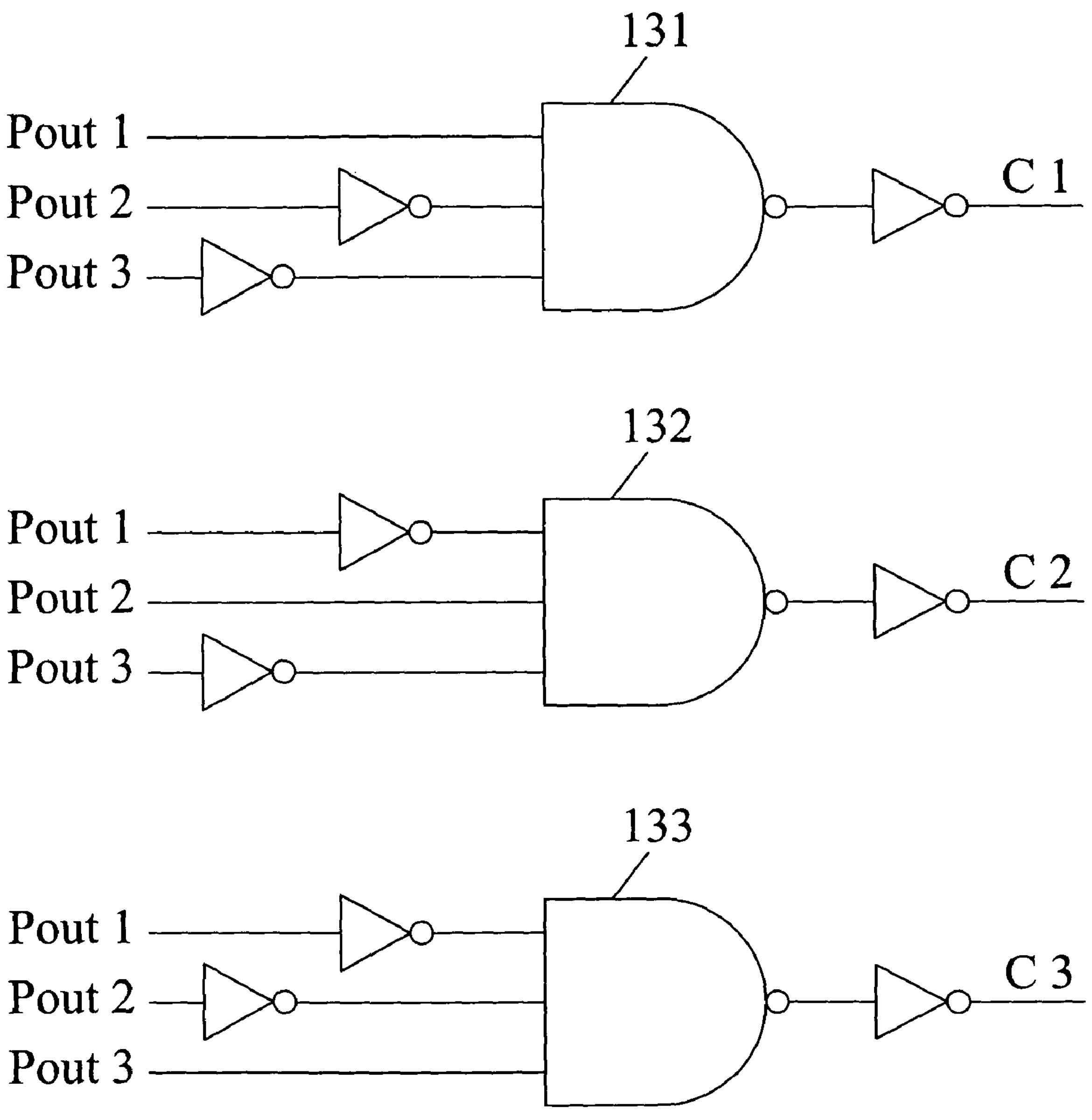
FIG. 4 is a schematic view of the logic control unit of the present invention.

Please refer to FIG. 4 for a schematic view of the logic control unit of the present invention. As shown in FIG. 4, the logic control unit 13 comprises three NAND gates 131, 132 and 133, and several inverters. After the output signal Pout1, Pout2 and Pout3 of the time interval generating unit 12 are inputted to the logic control unit 13, the logic control unit 13 generates control signals C1, C2 and C3 according to the output signals Pout1, Pout2 and Pout3. If the voltage level of Pout1, Pout2 and Pout3 is $V_L$, it means logic 0. And if the voltage level of Pout1, Pout2 and Pout3 is $V_H$, it means logic 1. The control signals C1, C2 and C3 are corresponding to a first I/O port, a second I/O port and a third I/O port respectively. When the control signal C1, C2 or C3 is raised to high voltage level, it means the corresponding I/O port is able to access the memory. For example, when the Pout1 is high voltage level (logic 1), and the Pout2 and Pout3 are low voltage level (logic 0), the control signal C1 outputted from logic control unit 13 is raised to high voltage level, and enables the first I/O port to access the memory.

As the conclusion of the content mentioned above, the present invention applies sense amplifiers with different VT values to generate time differences between access signals which are inputted simultaneously, so as to avoid the confliction resulted from that the memory is requested to access by access signals simultaneously. And the VT value of the sense amplifier further can be adjusted to satisfy the priority requested by the user.

While the present invention has been described by way of example and in terms of a preferred embodiment, it is to be understood that the present invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A priority control device comprising:

a clock generator, for generating a clock signal;

a time interval generating unit, having a plurality of signal routes which have different signal passing times respectively, and said time interval generating unit controlling the timing of receiving input signals according to said clock signal; and a logic control unit, coupled to the output of said signal routes, and for receiving the output signals of said signal routes to generate a plurality of control signals, wherein each of said signal routes comprises a sense amplifier, and said sense amplifier in each different said signal route has a different VT value so as to make said signal routes having different signal passing times respectively.

2. The priority control device of claim 1, wherein said time interval generating unit receives said input signals and let each one of said input signals pass through different one of said signal routes respectively.

3. The priority control device of claim 1, wherein said clock generator generates said clock signal when said input signals are inputted to said time interval generating unit simultaneously.

4. The priority control device of claim 1, wherein said control signals are applied for determining the power of using an I/O port.

5. The priority control device of claim 4, wherein each of time intervals between said signal passing times of said signal routes enables said I/O port to complete at least one access operation.

6. The priority control device of claim 1, wherein said logic control unit comprises a plurality of logic components.

7. A priority control device comprising:

a clock generator, for generating a clock signal;

a plurality of sense amplifiers, wherein one input of each said sense amplifier is for receiving said clock signal, and another input of each said sense amplifier is for receiving an access signal, and each different one of said sense amplifiers receives said access signal from different sources respectively, and said sense amplifiers have different voltage rise-times respectively; and a logic control unit, coupled with outputs of said sense amplifiers, for determining the power of using an I/O port according to output signals of said sense amplifiers.

8. The priority control device of claim 7, wherein said clock signal is for controlling the timing of said sense amplifiers to receive said access signals.

9. The priority control device of claim 7, wherein said clock generator generates said clock signal when said access signals are inputted to said sense amplifiers simultaneously.

10. The priority control device of claim 7, wherein said logic control unit comprises a plurality of logic components.

11. The priority control device of claim 7, wherein each of said sense amplifiers has different voltage rise-time so as to make a signal passes through different said sense amplifiers with different signal passing times respectively.

* * * * *